United States Patent
Ma et al.

(10) Patent No.: US 6,602,570 B1
(45) Date of Patent: Aug. 5, 2003

(54) ZONE BONDED LUBRICATION FOR HARD DISK RECORDING MEDIA

(75) Inventors: Xiaoding Ma, Fremont, CA (US); Raj Thangaraj, Fremont, CA (US); Huan Tang, Los Altos, CA (US); Michael J. Stirniman, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 184 days.

(21) Appl. No.: 09/781,976

(22) Filed: Feb. 14, 2001

Related U.S. Application Data

(60) Provisional application No. 60/182,293, filed on Feb. 14, 2000.

(51) Int. Cl.⁷ ................................................. G11B 5/82
(52) U.S. Cl. ............................... 428/65.4; 428/694 TP; 428/694 TC; 428/694 TF; 427/131
(58) Field of Search ................. 428/65.4, 694 TP, 428/694 TC, 694 TF, 900; 427/131

(56) References Cited

U.S. PATENT DOCUMENTS

| | | | |
|---|---|---|---|
| 4,552,799 A | * 11/1985 | Ryoke et al. | ............ 428/194 |
| 5,030,478 A | 7/1991 | Lin et al. | |
| 5,331,487 A | * 7/1994 | Gregory et al. | .......... 360/97.02 |
| 5,587,217 A | * 12/1996 | Chao et al. | ............... 428/65.4 |
| 5,650,900 A | 7/1997 | Wei et al. | |
| 5,674,582 A | 10/1997 | Eltoukhy et al. | |
| 5,820,945 A | 10/1998 | Wei et al. | |
| 5,822,163 A | 10/1998 | Lee et al. | |
| 6,096,385 A | 8/2000 | Yong et al. | |
| 6,110,330 A | 8/2000 | Lin et al. | |
| 6,168,831 B1 | * 1/2001 | Khan et al. | ................ 427/240 |
| 6,296,917 B1 | * 10/2001 | Nakakawaji et al. | ....... 428/65.4 |

FOREIGN PATENT DOCUMENTS

| JP | 06-111292 | * 4/1994 |
|---|---|---|
| WO | 99/04909 | * 2/1999 |

* cited by examiner

Primary Examiner—Stevan A. Resan
(74) Attorney, Agent, or Firm—Morrison & Foerster LLP

(57) ABSTRACT

A magnetic recording medium with low bonded lubricant at the landing zone, where the head takes off and lands, for better wear resistance, and with high bonded lubricant at the data zone to protect the data from corrosion, and a method of making the same are disclosed.

10 Claims, 5 Drawing Sheets

21 - Low bonded lubricant layer

22 - High bonded lubricant layer

ZONE BONDED LUBRICATION FOR HARD DISK RECORDING MEDIA

RELATED APPLICATIONS

This application claims priority from Provisional Application Serial No. 60/182,293 filed Feb. 14, 2000, entitled "ZONE BONDED LUBRICATION FOR HARD DISK RECORDING MEDIA," the entire disclosure of which is hereby incorporated herein by reference. This application is related to Ser. No. 09/708,504, filed Nov. 9, 2000, entitled "APPARATUS AND METHOD TO CONTROL THE MOLECULAR WEIGHT DISTRIBUTION OF A VAPOR," the entire disclosure of which is hereby incorporated herein by reference.

FIELD OF THE INVENTION

The present invention relates to recording media disks with low bonded lubricant at the landing zone, where the head takes off and lands, for better wear resistance, and with high bonded lubricant at the data zone to protect the data from corrosion.

BACKGROUND

Most modem information storage systems depend on magnetic recording due to its reliability, low cost, and high storage capacity. The primary elements of a magnetic recording system are the recording medium, and the read/write head. Magnetic discs with magnetizable media are used for data storage in almost all computer systems. Current magnetic hard disc drives operate with the read-write heads only a few nanometers above the disc surface and at rather high speeds, typically a few meters per second. Because the read-write heads can contact the disc surface during operation, a thin layer of lubricant is coated on the disc surface to reduce wear and friction.

A conventional longitudinal recording disk medium is depicted in FIG. 1 and typically comprises a non-magnetic substrate 10 having sequentially deposited on each side thereof an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat 14, 14' to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1, but does not comprise Cr-containing underlayers.

A conventional longitudinal recording disk medium is prepared by depositing multiple layers of metal films to make a composite film. In sequential order, the multiple layers typically comprise a non-magnetic substrate, one or more underlayers, a magnetic layer, and a protective carbon layer. Generally, a polycrystalline epitaxially grown cobalt-chromium (CoCr) magnetic layer is deposited on a chromium or chromium-alloy underlayer.

The seed layer, underlayer, and magnetic layer are conventionally sequentially sputter deposited on the substrate in an inert gas atmosphere, such as an atmosphere of pure argon. A conventional carbon overcoat is typically deposited in argon with nitrogen, hydrogen or ethylene. Conventional lubricant topcoats are typically about 20 Å thick.

Lubricants conventionally employed in manufacturing magnetic recording media typically comprise mixtures of long chain polymers characterized by a wide distribution of molecular weights and include perfluoropolyethers, functionalized perfluoropolyethers, perfluoropolyalkylethers (PFPE), and functionalized PFPE. PFPE do not have a flashpoint and they can be vaporized and condensed without excessive thermal degradation and without forming solid breakdown products. The most widely used class of lubricants include perfluoropolyethers such as AM 2001®, Z-DOL®, Ausimont's Zdol or Krytox lubricants from DuPont.

Lubricants are either applied to the recording media by a vapor phase lubrication process or by a dip coating technique. When lubricants are applied using a dip coating technique, the lubricant is dissolved in a solvent at low concentration, and the media are dipped into the solution and withdrawn, or the solution is pumped over the media and then drained away. As the media are lifted or the solution drained a meniscus of solution is dragged along the disc's surface, and as the solvent evaporates a thin film of the nonvolatile lubricant is left on the disc. The amount of lubricant in the film is controlled through varying either the concentration of lubricant in the solution or the rate at which the media is lifted or the solution drained, or both.

Most disk drives produced currently operate in the Contact Start/Stop (CSS) mode. Since the recording head contacts with recording media during takeoff and landing, wear due to a large number of CSS cycles is a major cause of drive failure. To ensure good wear durability, the desirable lubricant retention and replenishment abilities are critical. Another issue affecting the durability and reliability of hard disk drives is the corrosion of media. Our recent study shows the disks coated with high bonded lubricants demonstrate superior corrosion resistance to those with low bonded lubricant. Hence, we need to increase the bonding of the lubricant to the disk. However, it was observed that high bonded lubricant reduces the wear durability of the media in the landing zone. To solve the dilemma, it is desired to have the disks with low bonded lubricant ratio at the landing zone, where the head takes off and lands, for better wear resistance, and with high bonded lubricant ratio at the data zone to protect the data from corrosion. In addition, during the read/write operations, the head that flies over the data zone of the disk and picks up the lubricant. This alters its flying characteristics. High bonded lubricants at the data zone would also reduce the lubricant buildup on the heads.

U.S. Pat. No. 6,096,385 (Yong) discloses a method for a making magnetic disk with uneven distribution of bonded and unbonded lubricating molecules on the surface of the disk. Yong teaches applying a pair of lubrication layers on the top and bottom surfaces of a hard disk. Then, a specially designed photo mask is provided above the lubrication layer. The photo mask has a first zone and a second zone corresponding in area to the landing zone and the data zone. The first zone of the photo mask is made to have higher ultraviolet (UV) transmittivity than the second zone. The hard disk is then UV-irradiated under the specially designed photo mask. As a result of the uneven UV transmittivity of the photo mask, a corresponding uneven distribution of bonded and unbonded lubricant molecules in the lubricating layer is produced. The disadvantages of the Yong process are the following.

First, it is limited to using lubricants that are bonded by UV. Lubricants that are substantially impervious to UV or do not bond by being exposed to UV would not be useful.

Second, the lubricants for the Yong process must exhibit different degrees of bonding when exposed to different levels of UV. Third, the Yong process does not allow the use of different lubricants on different zones. Fourth, the Yong process requires the use of UV, which increases the process cost and requires safety equipment to prevent human exposure to UV.

Therefore, an improved recording medium having zone bonded lubrication with high bonded lubricant on the data zone and a low bonded lubricant on the landing zone and a process to selectively apply high bonded and low bonded lubricants to different areas of the recording media is needed.

SUMMARY OF THE INVENTION

An embodiment of this invention is a magnetic recording medium, comprising a data zone, a landing zone, a first data zone lubrication layer comprising a first data zone lubricant on the data zone and a landing zone lubrication layer comprising a landing zone lubricant on the landing zone, wherein the first data zone lubricant and the landing zone lubricant are not the same lubricant. The magnetic recording medium could further comprise a second data zone lubrication layer comprising a second data zone lubricant on the first data zone lubrication layer. The first data zone lubricant has a higher bonded ratio than that of the landing zone lubricant. The second data zone lubricant could the same as the landing zone lubricant. The combined thickness of the first data zone lubrication layer and the second data zone lubrication layer could be approximately equal to a thickness of the landing zone lubrication layer.

The first data zone lubricant has a property that is different from that of the landing zone lubricant, wherein the property is selected from the group consisting of a chemical property and a physical property. The first data zone lubricant has a property that is different from that of the landing zone lubricant, wherein the property is selected from the group consisting of composition, molecular structure, number average molecular weight, packing density of molecules, reactivity, boiling point, viscosity, dielectric constant and specific gravity. The first data zone lubricant and the landing zone lubricant could be a solid lubricant, a liquid lubricant or mixtures thereof.

In one embodiment, the first data zone lubricant is vapor deposited. In another embodiment, the first data zone lubrication layer is UV-irradiated. Yet, another embodiment is a method of depositing lubrication layers on a magnetic recording medium comprising a data zone and a landing zone, the method comprising depositing a first data zone lubricant on the data zone and depositing a landing zone lubricant on the landing zone, wherein the first data zone lubricant and the landing zone lubricant are not the same lubricant. The method could further comprise depositing a second data zone lubrication layer comprising a second data zone lubricant on the first data zone lubrication layer. The method could further comprise UV-irradiating the first data zone lubrication layer.

Another embodiment is a magnetic recording medium, comprising a magnetic recording medium, comprising multiple zones and means for lubricating the multiple zones. The phrase "means for lubricating the multiple zones" refers to a lubricant layer that is capable of preventing corrosion of the data zone and a lubricant layer that is capable of preventing wear of the landing zone by repeated CSS operation of a recording medium and equivalents thereof. The multiple zones could have different zones, e.g., landing zone, data zone and unused zone.

BRIEF DESCRIPTION OF THE DRAWINGS

The present invention will be better understood by reference to the Detailed Description of the Invention when taken together with the attached drawings.

DETAILED DESCRIPTION OF THE INVENTION

Figure 1:
FIG. 1 schematically shows a conventional magnetic recording medium in which lubrication layers 14, 14' are applied over the complete top and bottom surfaces of the recording medium (Prior Art).
Figure 2:
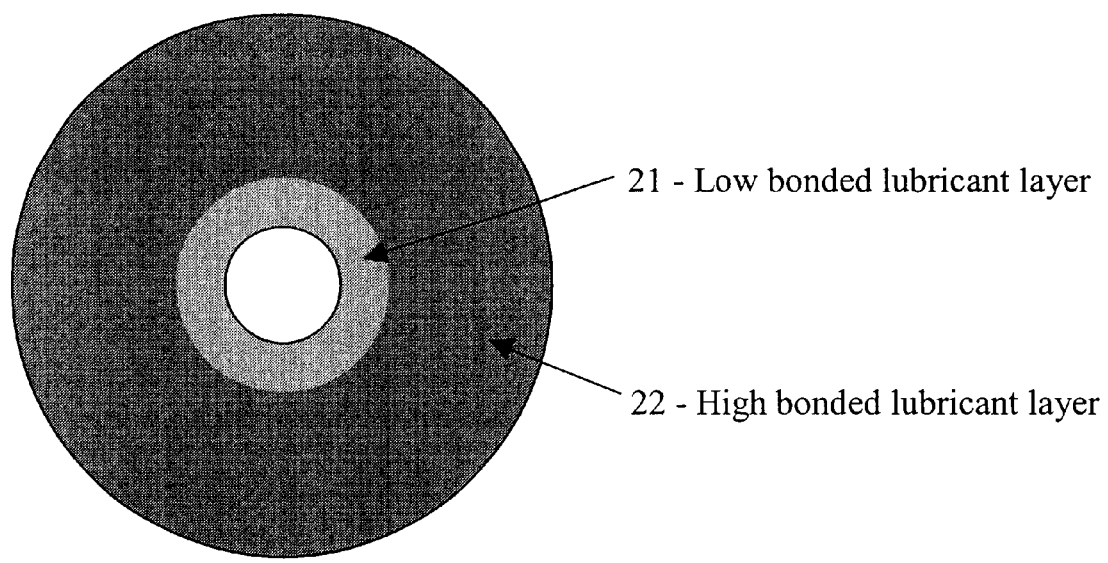
FIG. 2 is a graphical representation of a lubricant map of a zone bonded lubricated disk with a low bonded lubricant layer 21 at landing zone and a high bonded layer 22 at data zone.

The invention is directed to a method of coating a substrate, particularly recording media (recording discs), with a lubricant. This invention pertains to the concept of zone bonded lubrication, i.e., applying a lubricant layer of normal thickness over the disk with low bonded lubricant at the landing zone and high bonded lubricant at the data zone. An example of the desired lubricant pattern for a zone-lubricant bonded disk is shown in FIG. 2. The low bonded lubricant layer 21 covers the landing zone, to ensure that sufficient mobile lubricant for optimal CSS performance. The high bonded lubricant layer 22 covers the data zone to achieve good corrosion performance as well as minimize lubricant pick-up by a flying head. The lubricants at landing zone and data zone can have the same or different thickness.

Lubricants typically contain molecular weight components that range from several hundred Daltons to several thousand Daltons. The molecular components of low molecular weight will have a higher vapor pressure than the high molecular weight components.

The lubricants typically applied to recording media include polyfluoroether compositions that may be terminally functionalized with polar groups, such as hydroxyl, carboxy, or amino. The polar groups provide a means of better attaching or sticking the lubricant onto the surface of the recording media. These fluorinated oils are commercially available under such tradenames as Fomblin Z®, Fomblin Z-Dol®, Fomblin Ztetraol®, Fomblin Am2001®, Fomblin Z-DISOC® (Montedison); Demnum® (Daikin) and Krytox® (Dupont). The chemical structures of some of the Fomblin lubricants are shown below.

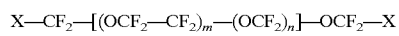

Fomblin Z: Non-reactive end groups

Fomblin Zdol: Reactive end groups

Fomblin AM2001: Reactive end groups

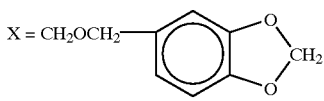

Fomblin Ztetraol: Reactive end groups

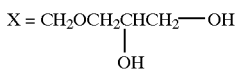

In this invention, the phrase "the same lubricant" refers to a lubricant that has substantially the same chemical structure and molecular weight as that of another lubricant. During a lubricant vapor lubrication process, the lubricant's vapor phase molecular weight distribution is dependent on the liquid phase distribution and the liquid phase temperature. As the lighter fractions of a polydisperse liquid lubricant are preferentially evaporated, over time the composition of both the liquid phase and vapor phase lubricant is changing. The shift in vapor phase molecular weight over time could result in some variations in the molecular weight of the lubricant from disc to disc. However, despite such a shift in the molecular weight of a lubricant during processing, the lubricant applied to a disk at an early stage of the vapor phase deposition process is considered to be "the same lubricant" as the lubricant applied to another disk at a later stage of the vapor deposition process.

To provide the lubricant vapor to the recording disc the lubricant, preferably a perfluorinated polyether, is heated, and the lubricant vapor deposits on the surface of the disc in an enclosed environment. Temperatures will generally range from 150° C. to 250° C. to provide deposition times in reasonable accordance with the rest of the disc manufacturing process. The thickness of the lubricant coating should be at least 0.5 nm, preferably at least 1 nm, and more preferably at least 1.2 nm and will generally be below 3 nm, preferably in the range from 1 nm to 3 nm. Molecular weight components of particular interest that provide higher film thicknesses range from 1 kD to 10 kD, preferably from 2 kD to 8 kD.

One way of describing a distribution of molecular components of a polymer, i.e., polydispersity, is to compare the weight average molecular weight defined as $$M_w = \Sigma m_i M_i / \Sigma m_i$$

where $m_i$ is the total mass of molecular component in the polymer having a molecular weight $M_i$, with the number average molecular weight defined as $$M_n = \Sigma N_i M_i / \Sigma N_i$$

where $N_i$ is the total number of each molecular component in the polymer having a molecular weight $M_i$. The weight average molecular weight ($M_w$) of a polymer will always be greater than the number average molecular weight ($M_n$), because the later counts the contribution of molecules in each class $M_i$ and the former weighs their contribution in terms of their mass. Thus, those molecular components having a high molecular weight contribute more to the average when mass rather than number is used as the weighing factor.

For all polydisperse polymers the ratio $M_w/M_n$ is always greater than one, and the amount by which this ratio deviates from one is a measure of the polydispersity of the polymer. The larger the $M_w/M_n$ ratio the greater the breadth of the molecular weight distribution of the polymer.

The molecular weight distribution of the vapor phase can be sampled by condensation of the vapor onto a suitable surface, followed by analysis of the condensate in a calibrated size exclusion chromatography system.

It is desirable that the fresh lubricant has a relatively narrow molecular weight distribution of molecular components. In practice, the narrower the distribution the easier it will be to maintain a steady-state concentration of one or more components in the vapor. For example, if the highest and lowest molecular weight components in the polymer have very similar molecular weights, their vapor pressures will also be very similar. On the other hand, if the molecular weights (vapor pressures) are dramatically different heating of the lubricant will require much greater temperature and process control for a steady state concentration to be maintained. The lubricant used in the invention should have a $M_w/M_n$ ratio between 1 and 1.6, preferably between 1 and 1.3, more preferably between 1 and 1.2.

The invention can be practiced with any commercial lubricant with a relatively large or small polydispersity, or with a lubricant that has been pre-fractionated to obtain a lubricant with a relatively small polydispersity. The preferred embodiment of the invention does not involve pre-fractionation of the lubricant. However, pre-fractionated lubricants may be used to provide relatively narrow molecular weight lubricant. If a pre-fractionated lubricant is used in the invention, the pre-fractionated lubricant can be obtained by distillation, chromatography, extraction, or other techniques that allow separation by molecular weight.

Bonded ratio: This term is defined as the ratio of the thickness of a lubricant on a disk after degreasing to the thickness of this lubricant on the disk before degreasing. It is a function of the lubricant and the process of depositing the lubricant. This ratio is determined as follows.

A lubricant is applied on a disk by vapor lubrication, dip lubrication or any other deposition method that could include any post lubrication process. The initial thickness of the lubricant ($t_1$) is about 2 nm. The disk is then immersed in the degreaser called Vertrel XF® (2,3-dihydrodecafluoropentane) for 1 minute under ambient condition. The disk is then removed from the degreaser and the thickness of the lubricant ($t_2$) is measured. All thickness measurements of the lubricants are performed by a Fourier Transform Infra-Red (FTIR) calibrated using X-ray photoelectron spectroscopy (XPS). The bonded ratio is $t_2/t_1$.

Suppose the thickness of Fomblin Z-Dol® after vapor deposition on the disk is $t_1$. Then dip the disk in a degreaser, i.e., Vertrel XF® (2,3-dihydrodecafluoropentane) for 1 minute under ambient condition. Suppose the thickness of Fomblin Z-Dol® after degreasing is $t_2$. Then, the bonded ratio is $t_2/t_1$.

A low bonded lubricant refers to a lubricant having a bonded ratio less than 0.5. A high bonded lubricant refers a lubricant having a bonded ratio of 0.5 or more. A low bonded lubrication layer refers to a layer composed of a low bonded lubricant. A high bonded lubrication layer refers to a layer composed of a high bonded lubricant.

EXAMPLES

Many methods can be used to perform the zone-bonded lubrication. The invention will be better understood with reference to the following examples, which are intended to illustrate specific embodiments within the overall scope of the invention as claimed.

Example 1

Figure 3:
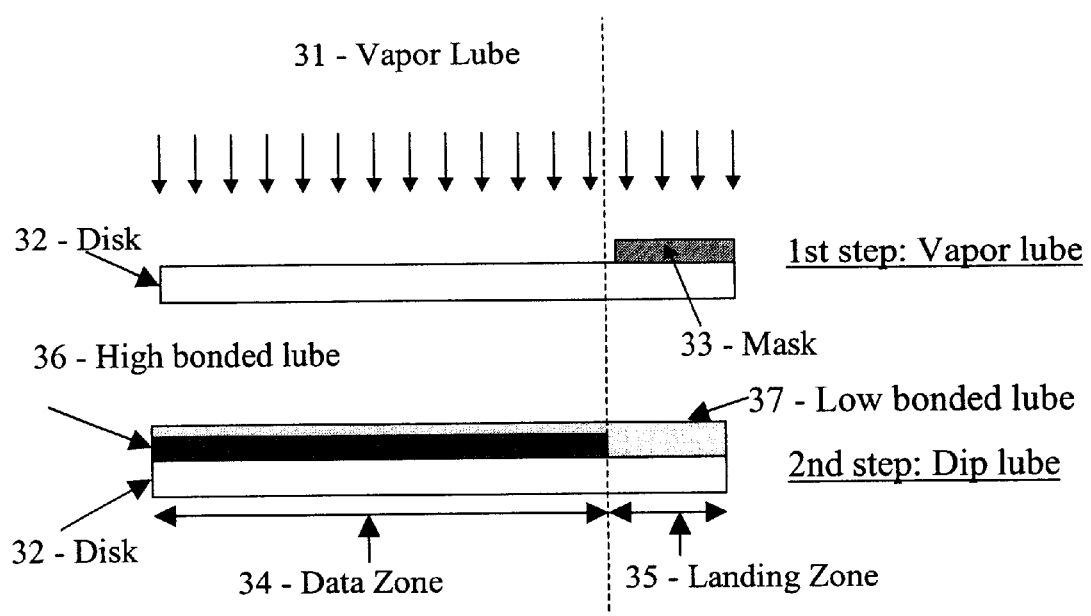
FIG. 3 is a schematic representation of the method of Example 1.

One example of the invention is shown schematically in FIG. 3. As shown in FIG. 3, the first step is vapor lubrication 31 of data zone 34 of disk 32 with a data zone lubricant, i.e., Fomblin Z-Dol®, to a thickness about 1.5 nm to form a high bonded data zone lubrication layer 36 while covering landing zone 35 with mask 33. The data zone lubricant is a high bonded lubrication layer because vapor deposition of Fomblin Z-Dol® gives a high bonded lubricant layer.

In one embodiment, the discs are contained in a deposition chamber held at a pressure sufficiently low so as to provide line of sight deposition of the lubricant vapor onto the disc surface. In this case a sufficiently low pressure would mean that the mean free path of the lubricant vapor is greater than the distance of the disc from the vapor source. For typical deposition geometries, a deposition chamber pressure to achieve reasonable mean free paths would be in the range of $10^{-5}$ to $10^{-8}$ mbar.

One example of the line of sight deposition of the lubricant vapor, includes the vapor deposition device described in U.S. Pat. No. 6,099,896, the entire disclosure of which is incorporated herein by reference. The vapor deposition device directs a lubricant vapor through one or more orifices to produce a virtual beam of lubricant vapor. The lubricant vapor is used to coat recording media in one or more select locations. The device can also be used to direct lubricant vapor to the recording media without passing the lubricant through an orifice.

In these embodiments, the disc surface is maintained at a sufficiently low temperature to allow condensation of the lubricant vapor. Alternatively, the disc may be maintained at a temperature to allow selective condensation of higher molecular weight components from the vapor phase.

In the second step, the disk 32 is dipped in a tank containing the landing zone lubricant, i.e., Fomblin Z®, in a liquid form and withdrawn to form a low bonded liquid lubricant layer 37. The low bonded lubricant layer 37 covers the landing zone at a thickness of about 2 nm and the data zone lubricant layer 36 at a thickness of 0.5 nm.

The lubricant of the low bonded lubricant layer 37 could compositionally be different from the lubricant of the data zone lubricant layer 36. On the other hand, the lubricant of the data zone lubricant layer 36 and the lubricant of the low bonded lubricant layer 37 could be compositionally the same, i.e., Fomblin Z-Dol®. Yet, the vapor deposited data zone lubrication layer 36 would be greatly different in its physical characteristics from the landing zone lubrication layer 37 deposited by dipping the disk 32 in a liquid lubricant. This is because vapor deposition would cause lubricant molecules to be tightly packed on the surface of the disk 32, resulting in high bonding of the lubricant to the surface. On the other hand, a lubricant applied to the surface of the disk 32 by dipping the disk 32 in a liquid lubricant does not result in tight packing of the molecules of the lubricant on the surface of the disk 32. Therefore, a lubricant deposited by dipping the disk 32 in a liquid lubricant would be weakly bonded to the surface of the disk 32.

As a result, there will be the layer of low bonded lubricant 37 having a layer of thickness about 2 nm at the landing zone and a layer of low bonded lubricant of thickness about 0.5 nm on top of the high bonded lubricant layer 36 of thickness about 1.5 nm at the data zone 34.

Example 2

Figure 4:
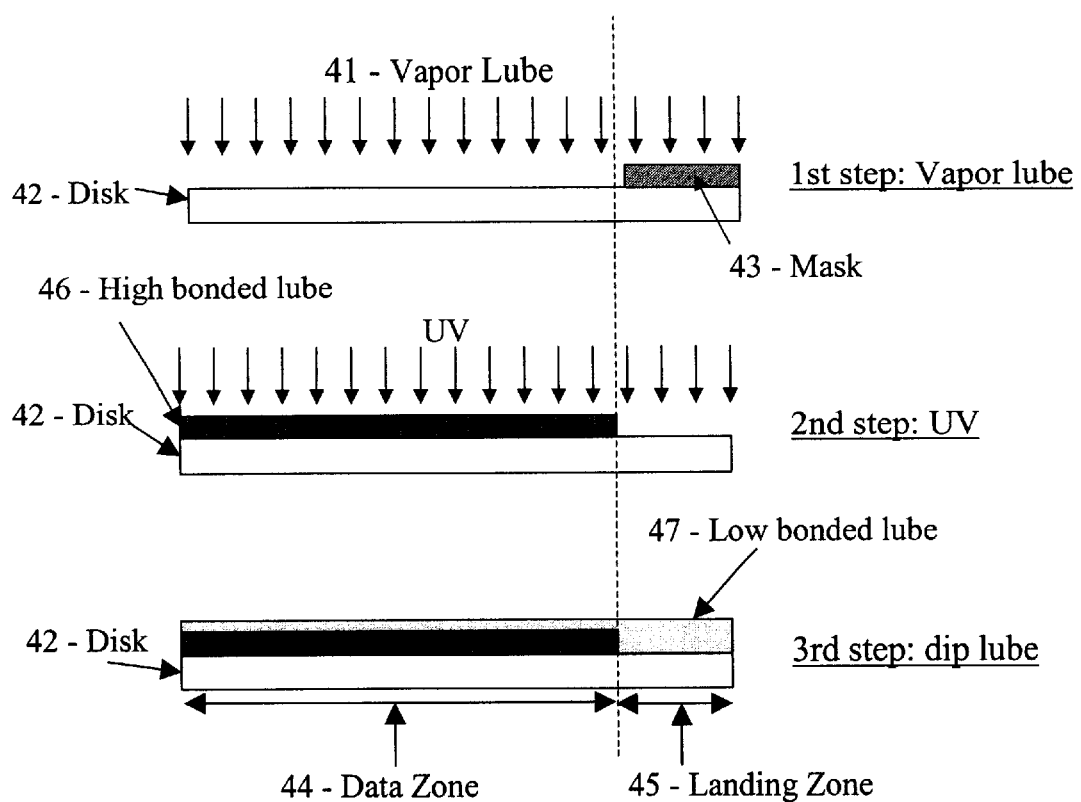
FIG. 4 is a schematic representation of the method of Example 2.

The second example of this invention is shown in FIG. 4. The first step is vapor lubrication 41 of data zone 44 of disk 42 with the data zone lubricant to a certain thickness as in Example 1. A high bonded lubricant layer, i.e., data zone lubrication layer 46, will be formed at the data zone 44. The second step is to expose the disk 42 to some form of radiation, such as UV. The UV exposure is of intensity about 20 mW/cm² under ambient condition for 1 minute. As a result, the bonding of the data zone lubrication layer 46 to the surface of the data zone 44 of the disk 42 will be further increased. Radiation likely increases the number of bonding sites on the surface of the disk 42, but it does not generally change the chemical structure or molecular weight of the lubricant of the data zone lubrication layer 46. Then, the third step is similar to the second step of Example 1.

Example 3

Figure 5:
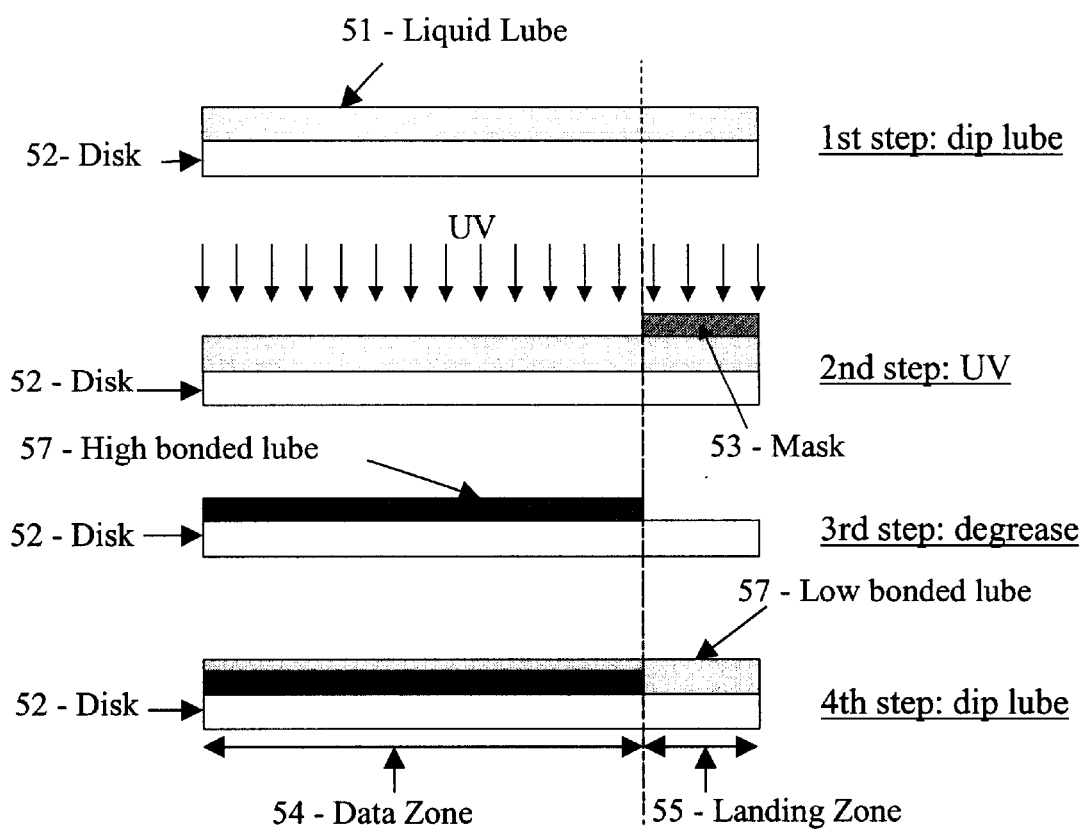
FIG. 5 is a schematic representation of the method of Example 3.

The third example of this invention is shown in FIG. 5. Step 1 is deposition of the first data zone lubricant, i.e., Fomblin Z-Dol®, by dipping disk 52 in a liquid form of the lubricant to produce lubrication layer 51 over the disk 52 of thickness about 1.5 nm. Step 2 is UV-irradiation of the lubricant layer 51 under the UV-irradiation conditions of Example 2 while masking landing zone 55 with mask 53 to produce a high bonded lubrication layer 57 over the data zone 54. Step 3 is to degrease the landing zone 55 by inserting the disk 52 in a degreaser, i.e., Vertrel XF®. Step 4 is the same as step 3 of Example 2.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. The entire disclosure of the patents and publications referred in this application are hereby incorporated herein by reference.

What is claimed is:

1. A magnetic recording disk medium, comprising:
   a data zone,
   a landing zone,
   a first data zone lubrication layer comprising a first data zone lubricant on the data zone,
   a second data zone lubrication layer comprising a second data zone lubricant on the first data zone lubrication layer and
   a landing zone lubrication layer comprising a landing zone lubricant on the landing zone,
   wherein the first data zone lubricant and the landing zone lubricant have substantially the same composition and
   further wherein the first data zone lubricant has a higher bonded ratio than that of the landing zone lubricant.

2. The magnetic recording medium according to claim 1, wherein the first data zone lubricant has a property that is different from that of the landing zone lubricant, wherein the property is selected from the group consisting of a chemical property and a physical property.

3. The magnetic recording medium according to claim 1, wherein the first data zone lubricant and the landing zone lubricant are a solid lubricant, a liquid lubricant or mixtures thereof.

4. The magnetic recording medium according to claim 1, wherein the first data zone lubricant is vapor deposited.

5. The magnetic recording medium according to claim 1, wherein the first data zone lubrication layer is UV-irradiated.

6. A method of depositing lubrication layers on a magnetic recording disk medium comprising a data zone and a landing zone, the method comprising:

depositing a first data zone lubricant on the data zone, depositing a second data zone lubrication layer comprising a second data zone lubricant on the first data zone lubricant layer and depositing a landing zone lubricant on the landing zone, wherein the first data zone lubricant and landing zone lubricant have substantially the same composition and further wherein the first data zone lubricant has a higher bonded ratio than that of the landing zone lubricant.

7. The method of claim 6, wherein the second data zone lubricant is the same as the landing zone lubricant.

8. The method of claim 6, wherein the first data zone lubricant has a property that is different from that of the landing zone lubricant, wherein the property is selected from the group consisting of a chemical property and a physical property.

9. The method of claim 6, wherein the first data zone lubricant and the landing zone lubricant are a solid lubricant, a liquid lubricant or mixtures thereof.

10. The method of claim 6, wherein the first data zone lubricant is vapor deposited.

* * * * *